(12) United States Patent
Kim et al.

(10) Patent No.: US 12,431,594 B2
(45) Date of Patent: Sep. 30, 2025

(54) SECONDARY BATTERY

(71) Applicant: SK ON CO., LTD., Seoul (KR)

(72) Inventors: Ji Hyung Kim, Daejeon (KR); Young Ha Kim, Daejeon (KR); Sang Bin Lee, Daejeon (KR); Ho Jin Hwang, Daejeon (KR)

(73) Assignee: SK ON CO., LTD., Seoul (KR)

( * ) Notice: Subject to any disclaimer, the term of this patent is extended or adjusted under 35 U.S.C. 154(b) by 503 days.

(21) Appl. No.: 17/988,467

(22) Filed: Nov. 16, 2022

(65) Prior Publication Data
US 2023/0231282 A1    Jul. 20, 2023

(30) Foreign Application Priority Data
Jan. 19, 2022  (KR) .................. 10-2022-0007942

(51) Int. Cl.
*H01M 50/533* (2021.01)
*H01M 50/102* (2021.01)
*H01M 50/244* (2021.01)
*H01M 50/46* (2021.01)
*H01M 50/536* (2021.01)

(52) U.S. Cl.
CPC ....... *H01M 50/533* (2021.01); *H01M 50/102* (2021.01); *H01M 50/244* (2021.01); *H01M 50/46* (2021.01); *H01M 50/536* (2021.01)

(58) Field of Classification Search
None
See application file for complete search history.

(56) References Cited

U.S. PATENT DOCUMENTS

| | | | |
|---|---|---|---|
| 2011/0143193 A1* | 6/2011 | Ahn | H01M 50/103 429/176 |
| 2018/0269436 A1 | 9/2018 | Lee et al. | |
| 2020/0127337 A1* | 4/2020 | Kim | H01M 10/4235 |
| 2022/0285735 A1* | 9/2022 | Lee | H01M 10/04 |

FOREIGN PATENT DOCUMENTS

| | | |
|---|---|---|
| KR | 10-0686845 B1 | 2/2007 |
| KR | 10-2018-0104927 A | 9/2018 |
| KR | 10-2019-0023650 A | 3/2019 |
| KR | 10-2021-0006231 A | 1/2021 |

\* cited by examiner

*Primary Examiner* — Wyatt P McConnell
(74) *Attorney, Agent, or Firm* — Perkins Coie LLP

(57) ABSTRACT

A secondary battery includes an electrode assembly including a first electrode plate, a separator, and a second electrode plate, a lower case in which the electrode assembly is accommodated and electrode tabs are provided on sidewalls opposing each other, an upper case coupled to the lower case, and an outer casing disposed to surround the lower case and the upper case. The electrode assembly is provided with a first uncoated electrode portion extending from the first electrode plate and a second uncoated electrode portion extending from the second electrode plate, and the first and second uncoated electrode portions are bent and connected to the electrode tab of the lower case.

17 Claims, 7 Drawing Sheets

SECONDARY BATTERY

CROSS-REFERENCE TO RELATED APPLICATION(S)

This patent document claims benefit of priority to Korean Patent Application No. 10-2022-0007942 filed on Jan. 19, 2022 in the Korean Intellectual Property Office, the disclosure of which is incorporated herein by reference in its entirety.

TECHNICAL FIELD

The present disclosure relates to a secondary battery.

BACKGROUND

A pouch-type secondary battery is easy to manufacture in various sizes and has the advantage of implementing a higher energy density than a prismatic secondary battery. However, compared to a prismatic secondary battery, such a pouch-type secondary battery is vulnerable to physical deformation, which is disadvantageous in terms of stability of the pouch-type secondary battery itself.

In addition, the pouch-type secondary battery has a structure in which the current density is gathered in a certain region due to the characteristics of the structure, and the current path is lengthened to decrease the electrical characteristics.

Furthermore, when designing a pouch-type secondary battery, a process of forming a pouch film needs to be properly designed in part because the thickness of the pouch-type secondary battery cannot be freely deformed due to the limited allowable elongation of the pouch film.

SUMMARY

An aspect of the present disclosure is to provide a secondary battery in which heat generation may be reduced by reducing resistance.

An aspect of the present disclosure is to provide a secondary battery in which a length of a path through which current flows may be reduced.

An aspect of the present disclosure is to provide a secondary battery in which the thickness may be freely deformed.

According to an aspect of the present disclosure, a secondary battery includes an electrode assembly including a first electrode plate, a separator, and a second electrode plate, a lower case in which the electrode assembly is accommodated and electrode tabs are provided on sidewalls opposing each other, an upper case coupled to the lower case, and an outer casing disposed to surround the lower case and the upper case. The electrode assembly is provided with a first uncoated electrode portion extending from the first electrode plate and a second uncoated electrode portion extending from the second electrode plate, and the first and second uncoated electrode portions are bent and connected to the electrode tab of the lower case.

The electrode tab may be disposed on a side wall having a shorter length among four side walls of the lower case to be exposed to an internal space of the lower case and to an outside of the lower case.

The first and second uncoated electrode portions and the electrode tab may be joined by welding.

The upper case may include an opening to which the electrode tab is exposed.

A side wall of the upper case may be inserted and disposed in an internal space of the lower case.

A height of a side wall of the upper case may be less than a thickness of the electrode assembly before assembly.

The outer casing may press against the electrode assembly while enclosing the upper case and the lower case.

Both ends of the outer casing may be provided as folding parts folded to side walls of the lower case on which the electrode tab is disposed.

The folding parts may include a first sealing portion disposed above and below the electrode tab, and a second sealing portion disposed on both sides of the electrode tab.

According to an aspect of the present disclosure, a secondary battery includes an electrode assembly including a first electrode plate, a separator, and a second electrode plate, a lower case in which the electrode assembly is accommodated, the lower case being provided with electrode tabs provided on sidewalk thereof opposing each other, un upper case coupled to the lower case, and an outer casing surrounding the lower case and the upper case. A height of a side wall of the upper case has a height that allows the upper case to be press against the electrode assembly.

According to an aspect of the present disclosure, a secondary battery includes an electrode assembly including a first electrode plate, a separator, and a second electrode plate, a lower case in which the electrode assembly is accommodated and electrode tabs are provided on sidewalls opposing each other, an upper case coupled to the lower case, and an outer casing disposed to surround the lower case and the upper case. The outer casing presses against the electrode assembly while surrounding the upper case and the lower case, and the outer casing includes folding parts disposed on both sides of the lower case.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
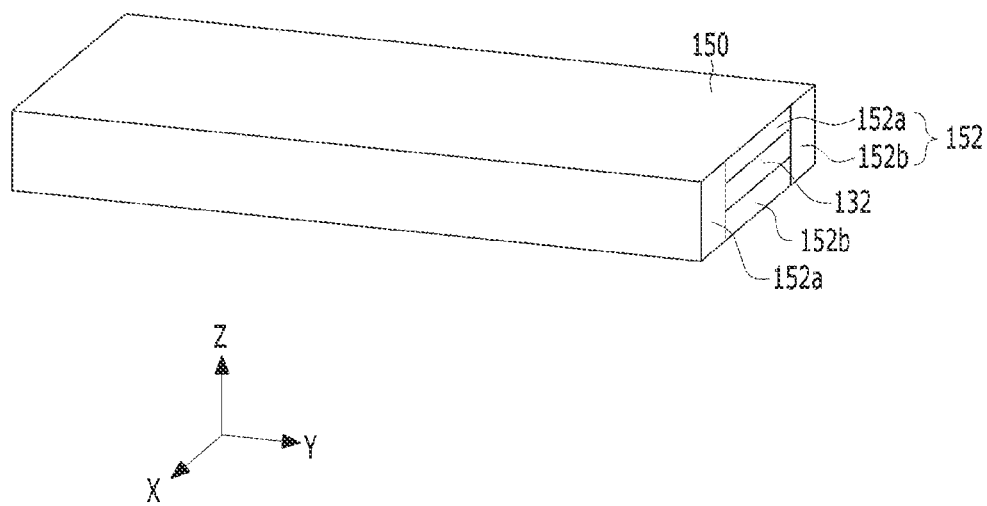
FIG. 1 is a perspective view illustrating a secondary battery according to an embodiment.

Hereinafter, embodiments will be described with reference to the accompanying drawings. However, the embodiment may be modified in various other forms, and the scope of the present disclosure is not limited to the embodiments described below. In addition, the embodiments are provided in order to more completely describe the present disclosure to those of ordinary skill in the art. The shapes and sizes of elements in the drawings may be exaggerated for clearer description.

Figure 2:
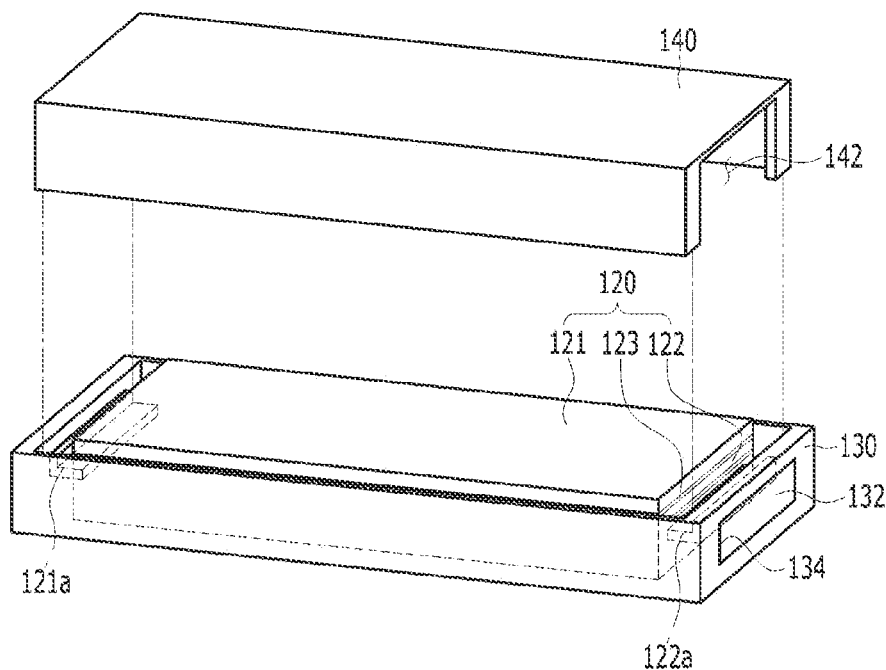
FIG. 2 is an exploded perspective view illustrating a partial configuration of a secondary battery according to an embodiment.

FIG. 1 is a perspective view illustrating a secondary battery according to an embodiment, and FIG. 2 is an exploded perspective view illustrating a partial configuration of a secondary battery according to an embodiment.

Referring to FIGS. 1 and 2, a secondary battery 100 according to an embodiment may be configured to include, as an example, an electrode assembly 120, a lower case 130, an upper case 140, and an outer casing 150.

The electrode assembly 120 is accommodated in an internal space formed by the lower case 130 and the upper case 140. As an example, the electrode assembly 120 may include a first electrode plate 121, a second electrode plate 122, and a separator 123 formed in a thin plate shape or a film shape, and may be formed in various forms as needed, such as a laminated type or a wound type. For example, the first electrode plate 121 may serve as a cathode, and the second electrode plate 122 may serve as an anode.

The first electrode plate 121 may be formed by coating a first electrode active material such as graphite or carbon on a first electrode current collector formed of, for example, a metal foil such as copper, a copper alloy, nickel, or a nickel alloy. In addition, the first electrode plate 121 includes a first uncoated electrode portion 121a that is an area in which the first electrode active material is not applied. The first uncoated electrode portion 121a serves as a path for current flow between the first electrode plate 121 and the outside of the first electrode plate 121.

The second electrode plate 122 may be formed by coating a second electrode active material such as a transition metal oxide on a second electrode current collector formed of, for example, a metal foil such as aluminum or an aluminum alloy. In addition, the second electrode plate 122 includes a second uncoated electrode portion 122a that is an area in which the second electrode active material is not applied. The second uncoated electrode portion 122a also serves as a passage for current flow between the second electrode plate 122 and the outside of the second electrode plate 122.

The separator 123 is positioned between the first electrode plate 121 and the second electrode plate 122 to prevent short circuits and enable movement of lithium ions. For example, the separator 123 may be formed of polyethylene, polypropylene, or a composite film of polyethylene and polypropylene.

As an example, the first electrode plate 121, the second electrode plate 122, and the separator 123 may be arranged in a height direction of the lower case 130. In detail, the first electrode plate 121, the separator 123, and the second electrode plate 122 may be alternately stacked in order in the Z-axis direction of FIG. 2.

On the other hand, the first uncoated electrode portion 121a and the second uncoated electrode portion 122a may have a bent shape for bonding to an electrode tab 132 of the lower case 130, which will be described later.

The lower case 130 accommodates the electrode assembly 120 therein, and electrode tabs 132 are provided on sidewalls facing each other. As an example, the lower case 130 has a rectangular parallelepiped box shape with an open top, and electrode tabs 132 ay be provided on two short sidewalls of the four sidewalls of the lower case 130. As an example, on two sidewalls of the lower case 130, one side of the electrode tab 132 may be exposed to the internal space of the lower case 130, and the other side thereof may be exposed to the outside of the lower case 130. On the other hand, two sidewalls of the lower case 130 having a short length may be provided with installation holes 134 in which the electrode tabs 132 are to be installed.

On the other hand, the lower case 130 may be formed of an insulating material, and the electrode tab 132 may be formed of a conductive material.

In addition, the first uncoated electrode portion 121a and the second uncoated electrode portion 122a may be joined to the electrode tab 132 by welding, for example. In detail, some of the bent portions of the first uncoated electrode portion 121a and the second uncoated electrode portion 122a are in contact with the electrode tab 132 as illustrated in FIG. 2, and the first uncoated electrode portion 121a and the second uncoated electrode portion 122a may be joined to the electrode tab 132 by welding.

On the other hand, in the present embodiment, the case in which the electrode tab 132 is provided on the lower case 130 is described as an example, but the present disclosure is not limited thereto, and the electrode tab may be provided on the upper case.

The upper case 140 is coupled to the lower case 130 and forms an internal space together with the lower case 130. As an example, the sidewall of the upper case 140 may be inserted into the internal space of the lower case 130. In addition, the height of the sidewall of the upper case 140 may be smaller than the thickness of the electrode assembly 120 before assembly. In detail, when the assembly of the secondary battery 100 is completed, the electrode assembly 120 may be pressed and compressed by the upper case 140 and the lower case 130. On the other hand, the upper case 140 may include an opening 142 in a region opposite to the portion where the electrode tab 132 is formed of the lower case 130. In detail, the openings 142 for connecting the electrode tab 132 and the first uncoated electrode portion 121a and the second uncoated electrode portion 122a may be provided on the two sidewalls of the upper case 140 with short lengths. Accordingly, the first uncoated electrode portion 121a and the second uncoated electrode portion 122a may be bonded to the electrode tab 132 without interfering with the upper case 140.

On the other hand, the upper case 140 may also be formed of the same material as the lower case 130. In detail, the upper case 140 may also be formed of, for example, an insulating material.

On the other hand, the electrolyte may be filled in the internal space formed by the lower case 130 and the upper case 140. As an example, the electrolyte may be formed of a lithium salt such as $LiPF_6$ or $LiBF_4$ in an organic solvent such as ethylene carbonate (EC), propylene carbonate (PC), diethyl carbonate (DEC), ethylmethyl carbonate (EMC), or dimethyl carbonate (DMC). In addition, the electrolyte may be in a liquid or gel form.

The outer casing 150 is disposed to surround the lower case 130 and the upper case 140. As an example, the outer casing 150 is installed to be wound around the lower case 130 and the upper case 140 in one direction, and both ends of the outer casing 150 are folded to form folding parts 152. The folding part 152 may be disposed on the outer surface of the side wall having a short length of the lower case 130. As an example, the folding part 152 may include a first sealing portion 152a disposed above and below the electrode tab 132, and a second sealing portion 152b disposed on both sides of the electrode tab 132. A portion of the second sealing portion 152b may be disposed to overlap a portion of the first sealing portion 152a.

Then, the outer casing 150 presses against the electrode assembly 120 while surrounding the lower case 130 and the upper case 140. Accordingly, the electrode assembly 120 may be compressed and the lower surface of the upper case 140 may be in contact with the lower case 130.

On the other hand, the outer casing 150 may be formed of a laminate sheet including a metal layer and a resin layer. In detail, the laminate sheet may be an aluminum laminate sheet. As an example, the outer casing 150 may include a core formed of a metal layer, a heat-sealing layer formed on an upper surface of the core, and an insulating film formed on a lower surface of the core.

The heat-sealing layer acts as an adhesive layer using a polymer resin modified polypropylene, for example, Cast Polypropylene (CPP), and the insulating film may be formed of a resin material such as nylon or polyethylene terephthalate (PET), but in this case, the structure and material of the outer casing 150 are not limited.

As described above, a portion of the bent portion of the first uncoated electrode portion 121a and the second uncoated electrode portion 122a is bonded to the electrode tab 132 and is connected to external power on the electrode tab 132 of the lower case 130, thereby reducing the length of the path through which the current flows. Accordingly, the amount of heat generation may be reduced by reducing the resistance.

In addition, since the electrode assembly 120 is compressed through the lower case 130 and the upper case 140, the secondary battery 100 having a high density may be provided.

Furthermore, since the electrode assembly 120 is compressed, the contact ability at the electrode interface may be improved.

In addition, since the electrode assembly 120 is disposed inside the lower case 130 and the upper case 140, the rigidity of the secondary battery 100 may be improved.

Hereinafter, a method of manufacturing a secondary battery according to an embodiment will be described with reference to the drawings.

Figure 3:
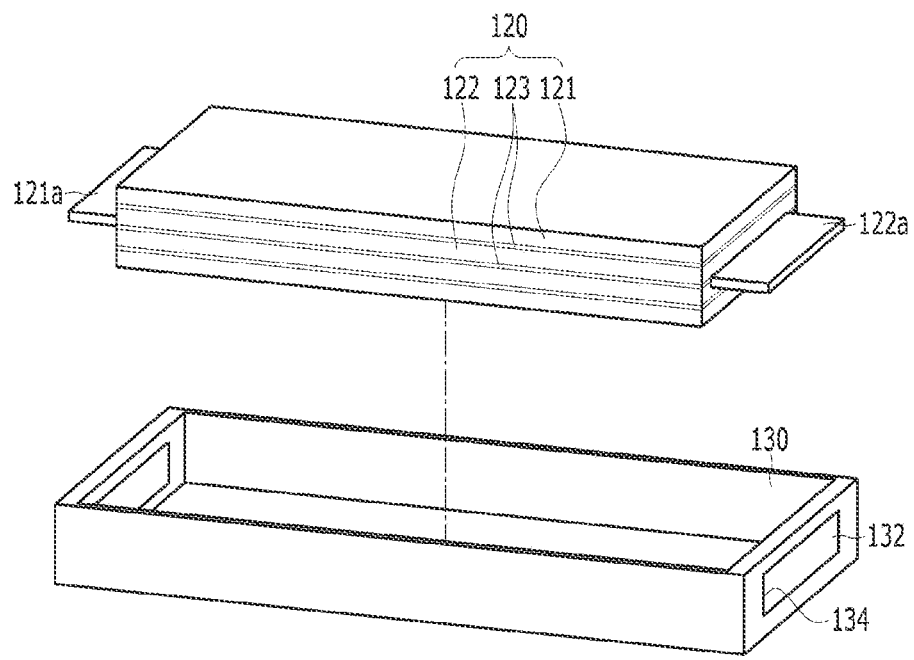
FIG. 3 is a view illustrating the assembly of an electrode assembly and a lower case of a secondary battery according to the embodiment.

First, as illustrated in FIG. 3, the electrode assembly 120 is inserted into the internal space of the lower case 130. In this case, the first uncoated electrode portion 121a and the second uncoated electrode portion 122a of the electrode assembly 120 are bent for bonding to the electrode tab 132 of the lower case 130.

Figure 4:
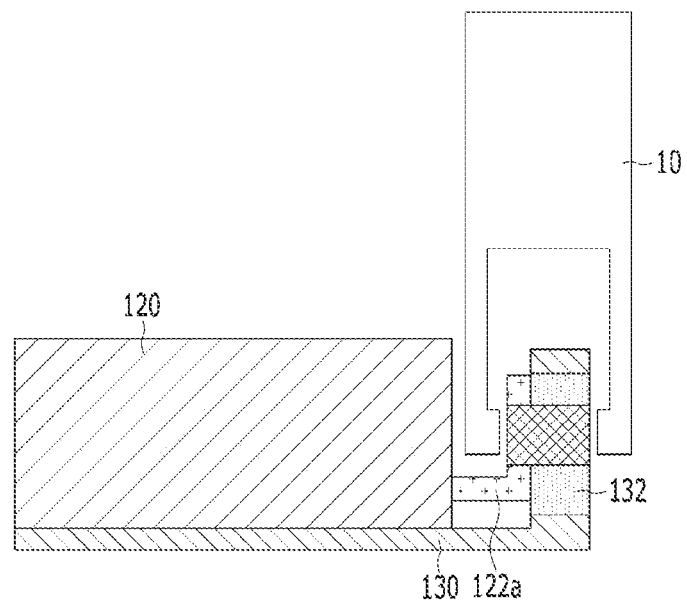
FIG. 4 is a view illustrating the bonding of first and second uncoated electrode portions and the electrode tab of the secondary battery according to an embodiment.

Thereafter, as illustrated in FIG. 4, the first uncoated electrode portion 121a and the second uncoated electrode portion 122a of the electrode assembly 120 are joined to the electrode tab 132 of the lower case 130 by a welding apparatus 10. However, the present disclosure is not limited thereto, and the first uncoated electrode portion 121a and the second uncoated electrode portion 122a of the electrode assembly 120 may be welded to the electrode tab 132 while being bent by the welding apparatus 10.

Figure 5:
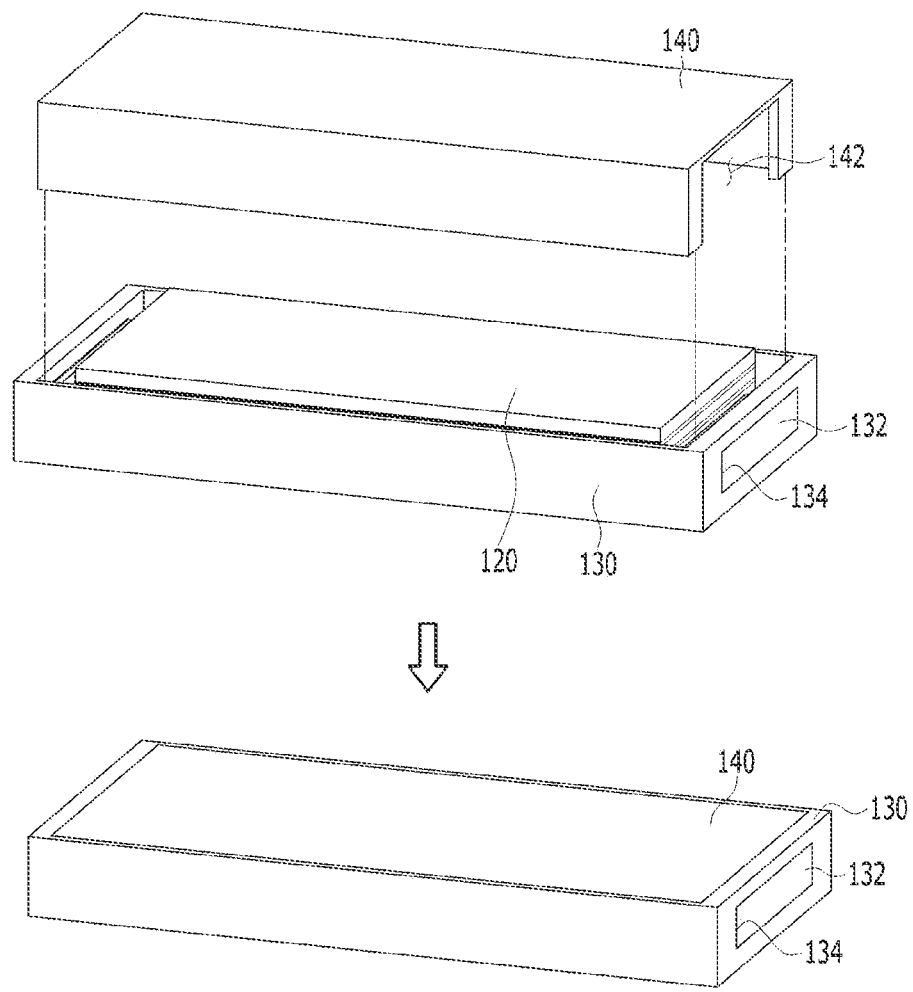
FIG. 5 is a view illustrating the assembly of an upper case of a secondary battery according to an embodiment.
Figure 6:
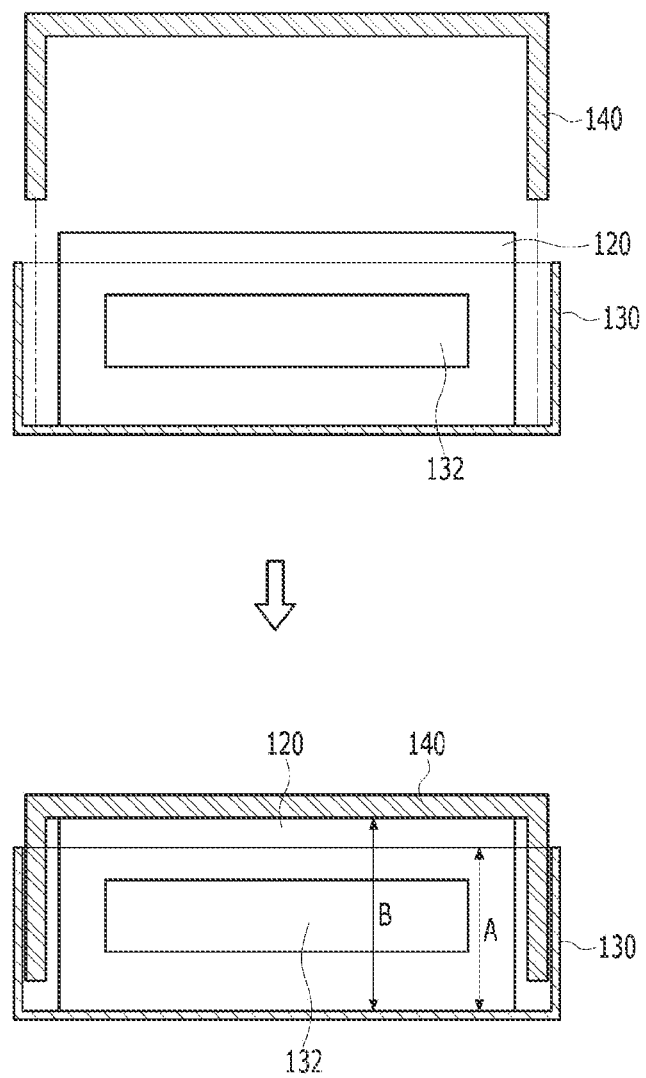
FIG. 6 is a side view illustrating the assembly of an upper case of a secondary battery according to an embodiment.

Thereafter, as illustrated in FIGS. 5 and 6, the upper case 140 is coupled such that the upper case 140 covers the upper portion of the electrode assembly 120. In this case, the sidewall of the upper case 140 is inserted into the internal space of the lower case 130, and the thickness of the electrode assembly 120 may be greater than the height of the sidewall of the upper case 140. In detail, the lower surface of the sidewall of the upper case 140 may be spaced apart from the lower case 130. For example, a thickness B of the electrode assembly 120 may be greater than a height A of the sidewall of the lower case 130 or the height of the sidewall of the upper case 140. Accordingly, when the upper case 140 is coupled to the lower case 130 and the electrode assembly 120 is not compressed, the bottom surface of the sidewall of the upper case 140 is spaced apart from the lower case 130.

Figure 7:
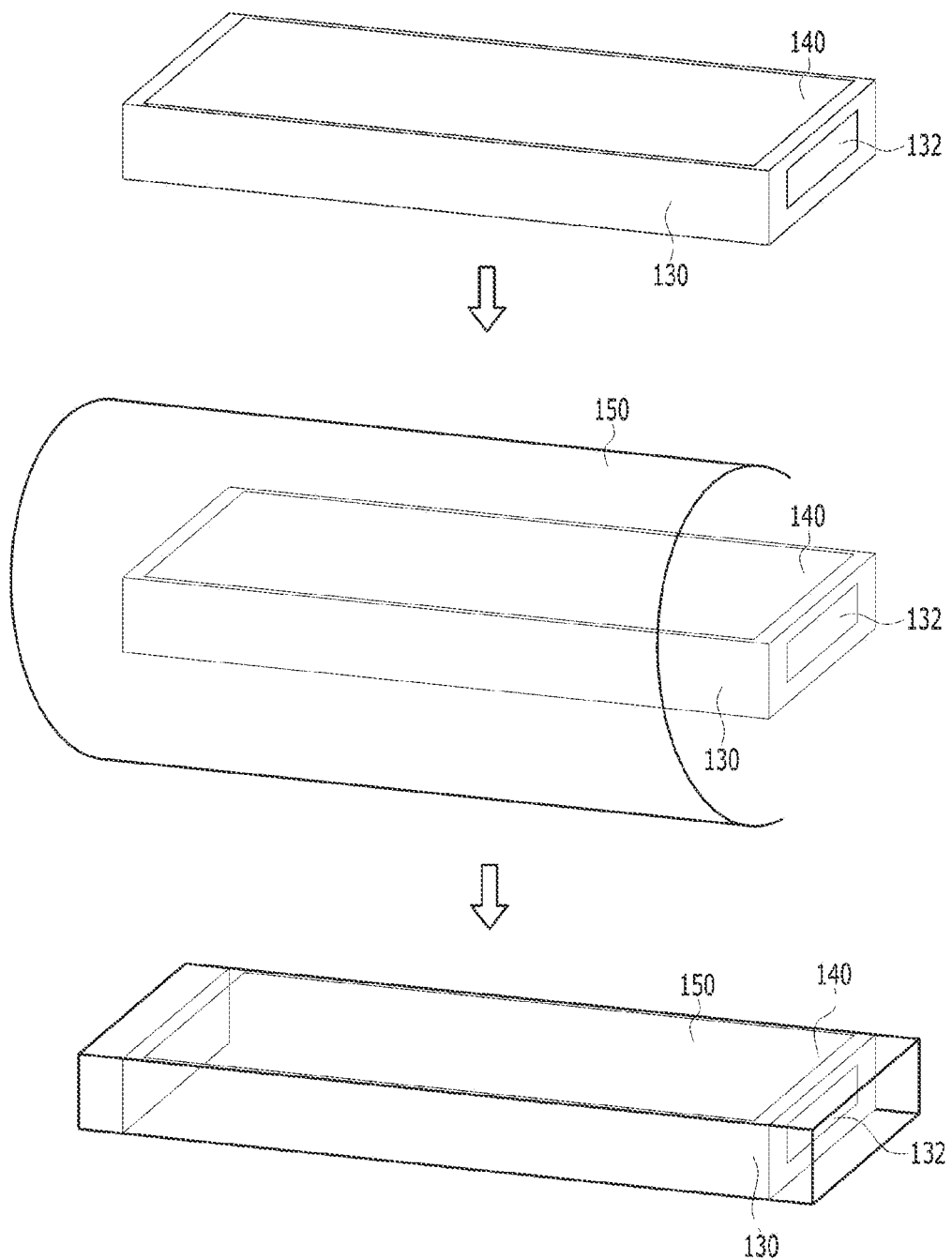
FIG. 7 is a view illustrating the assembly of the outer casing of a secondary battery according to an embodiment.
Figure 8:
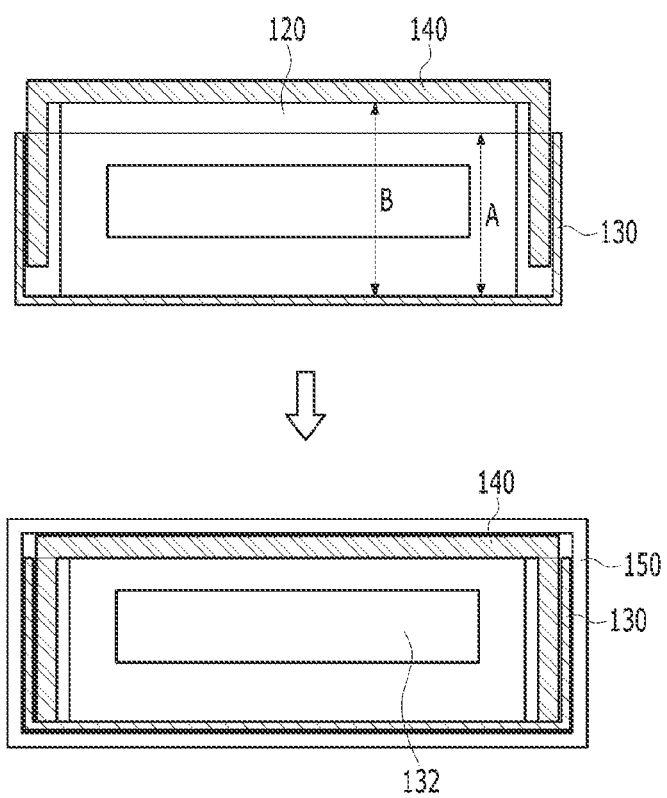
FIG. 8 is a cross-sectional view illustrating the assembly of an outer casing of a secondary battery according to the embodiment.

Thereafter, as illustrated in FIGS. 7 and 8, the outer casing 150 is disposed to be wound around the lower case 130 and the upper case 140 in one direction, and the lower case 130 and the upper case 140 are pressed by the outer casing 150. Accordingly, the electrode assembly 120 is compressed by the lower case 130 and the upper case 140. Accordingly, the lower surface of the side wall of the upper case 140 may be in contact with the lower case 130. In detail, as illustrated in FIG. 8, the thickness B of the electrode assembly 120 before assembly of the outer casing 150 may be greater than the height A of the sidewall of the lower case 130 or the height of the sidewall of the upper case 140. Accordingly, when the upper case 140 is coupled to the lower case 130 and the electrode assembly 120 is not compressed, the lower surface of the sidewall of the upper case 140 is spaced apart from the lower case 130. Thereafter, when the lower case 130 and the upper case 140 are pressed by the outer casing 140, the electrode assembly 120 is compressed and the lower surface of the side wall of the upper case 140 may be in contact with the lower case 130.

Figure 9:
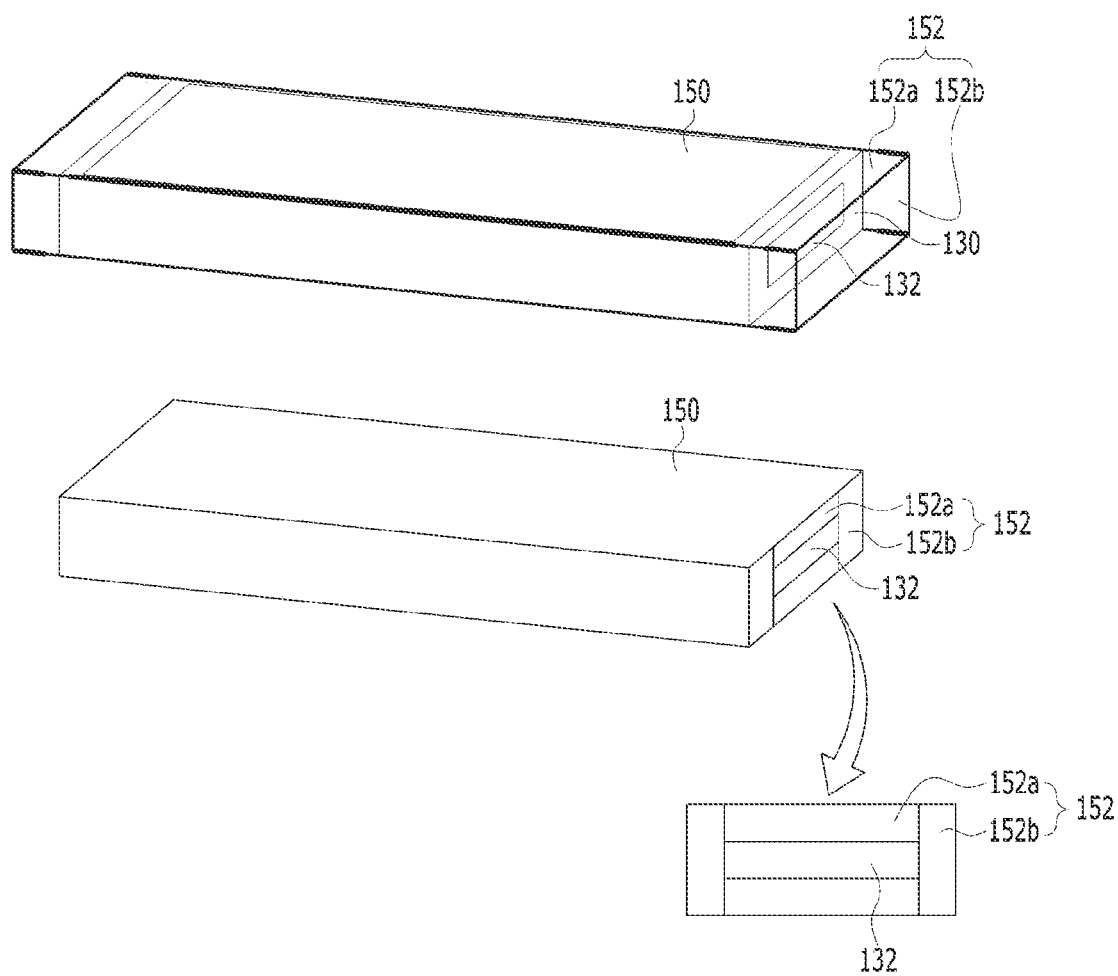
FIG. 9 is a side view illustrating a folding part of an outer casing of a secondary battery according to the embodiment.

Thereafter, as illustrated in FIGS. 9 and 10, both ends of the outer casing 150 are folded toward the electrode tab 132 to form the folding parts 152. The folding part 152 includes a first sealing portion 152a disposed above and below the electrode tab 132, and a second sealing portion 152b disposed on both sides of the electrode tab 132, and the first and second sealing portions 152a and 152b may be the configurations formed by folding both ends of the outer casing 150. On the other hand, a portion of the second sealing portion 152b may be disposed to overlap a portion of the first sealing portion 152a. As an example, edge regions of both end portions of the outer casing 150 may be cut to form the folding parts 152. Thereafter, the folding part 152 may be formed by folding both ends of the outer casing 150 that is cut and divided into four parts. In this case, the folding part 152 may be formed by first folding the first sealing portion 152a toward both side surfaces of the lower case 130 and then folding the second sealing portion 152b. In addition, portions of the first sealing portion 152a and the second sealing portion 152b may be joined to each other by thermal fusion. On the other hand, the folding order of the first sealing portion 152a and the second sealing portion 152b may be changed. In detail, after the second sealing portion 152b is first folded, the first sealing portion 152a may be folded to cover a partial area of the second sealing portion 152b.

Accordingly, the secondary battery 100 has a rectangular parallelepiped shape, and the electrode tab 132 connected to the external power source may be exposed to the outside.

As described above, a portion of the bent portions of the first uncoated electrode portion 121a and the second uncoated electrode portion 122a is bonded to the electrode tab 132 and is connected external power on the electrode tab 132 of the lower case 130, and therefore, the length of the path through which the current flows may be reduced. Accordingly, the amount of heat generation may be reduced by reducing the resistance.

In addition, since the electrode assembly 120 is compressed through the lower case 130 and the upper case 140, the secondary battery 100 having a high density may be provided.

Furthermore, since the electrode assembly 120 is compressed, the contact ability at the electrode interface may be improved.

In addition, since the electrode assembly 120 is disposed inside the lower case 130 and the upper case 140, the rigidity of the secondary battery 100 may be improved.

As set forth above, in an embodiment, there is an effect of reducing heat generation by reducing resistance.

In addition, in an embodiment, the length of the path through which the current flows may be reduced.

In addition, in an embodiment, there is an effect that the thickness may be freely deformed.

While embodiments have been illustrated and described above, it will be apparent to those skilled in the art that modifications and variations could be made based on what is described or/and illustrated in this patent document.

What is claimed is:

1. A secondary battery comprising:
an electrode assembly including a first electrode plate, a separator, and a second electrode plate;
a lower case in which the electrode assembly is accommodated and electrode tabs are provided on sidewalls opposing each other;
an upper case coupled to the lower case; and
an outer casing disposed to surround the lower case and the upper case,
wherein the electrode assembly includes a first uncoated electrode portion extending from the first electrode plate and a second uncoated electrode portion extending from the second electrode plate,
the first and second uncoated electrode portions are bent and connected to the electrode tabs of the lower case, and
at least a portion of the electrode tabs of the lower case are exposed to an outside of the outer casing.

2. The secondary battery of claim 1, wherein each electrode tab is disposed on a side wall having a shorter length among four side walls of the lower case to be exposed to an internal space of the lower case and to an outside of the lower case.

3. The secondary battery of claim 2, wherein the first and second uncoated electrode portions and the electrode tabs are joined by welding.

4. The secondary battery of claim 1, wherein the upper case includes an opening to which an electrode tab is exposed.

5. The secondary battery of claim 4, wherein a side wall of the upper case is inserted and disposed in an internal space of the lower case.

6. The secondary battery of claim 5, wherein a height of a side wall of the upper case is less than a thickness of the electrode assembly before assembly.

7. The secondary battery of claim 1, wherein the outer casing presses the electrode assembly while enclosing the upper case and the lower case.

8. A secondary battery comprising:
an electrode assembly including a first electrode plate, a separator, and a second electrode plate;
a lower case in which the electrode assembly is accommodated and electrode tabs are provided on sidewalls opposing each other;
an upper case coupled to the lower case; and
an outer casing disposed to surround the lower case and the upper case,
wherein the electrode assembly includes a first uncoated electrode portion extending from the first electrode plate and a second uncoated electrode portion extending from the second electrode plate,
the first and second uncoated electrode portions are bent and connected to the electrode tabs of the lower case, and
the outer casing presses the electrode assembly while enclosing the upper case and the lower case, wherein both ends of the outer casing are provided as folding parts folded to side walls of the lower case on which the electrode tabs are disposed.

9. The secondary battery of claim 8, wherein the folding parts include a first sealing portion disposed above and below the electrode tabs, and a second sealing portion disposed on both sides of the electrode tab.

10. A secondary battery comprising:
an electrode assembly including a first electrode plate, a separator, and a second electrode plate;
a lower case in which the electrode assembly is accommodated;
an upper case coupled to the lower case; and
an outer casing surrounding the lower case and the upper case,
wherein a height of a side wall of the upper case has a height so that the upper case presses against the electrode assembly,
electrode tabs electrically connected to the electrode assembly are provided on the lower case,
at least a portion of the electrode tabs of the lower case are exposed to an outside of the outer casing.

11. The secondary battery of claim 10, wherein the side wall of the upper case is inserted and disposed in an internal space of the lower case, and
the outer casing presses against the electrode assembly while enclosing the upper case and the lower case.

12. A secondary battery comprising:
an electrode assembly including a first electrode plate, a separator, and a second electrode plate;
a lower case in which the electrode assembly is accommodated;
an upper case coupled to the lower case; and
an outer casing disposed to surround the lower case and the upper case and structured to include folding parts disposed on both sides of the lower case,
wherein the outer casing presses against the electrode assembly.

13. The secondary battery of claim 12, wherein the electrode assembly includes a first uncoated electrode portion extending from the first electrode plate and a second uncoated electrode portion extending from the second electrode plate.

14. The secondary battery of claim 13, comprising an electrode tab in the lower case, wherein the first and second uncoated electrode portions are bent and connected to the electrode tab.

15. The secondary battery of claim 14, wherein the electrode tab is disposed on a side wall having a shorter length among four side walls of the lower case to be exposed to an internal space of the lower case and to an outside of the lower case.

16. The secondary battery of claim 14, wherein the first and second uncoated electrode portions and the electrode tab are joined by welding.

17. The secondary battery of claim 1, wherein the upper case includes an opening to which the electrode tab is exposed.

* * * * *